(12) United States Patent
Engelhardt et al.

(10) Patent No.: US 11,784,537 B2
(45) Date of Patent: Oct. 10, 2023

(54) DRIVE TRAIN WITH AN ELECTRIC MACHINE AND AN INVERTER, AND MOTOR VEHICLE

(71) Applicant: Dr. Ing. h.c. F. Porsche Aktiengesellschaft, Stuttgart (DE)

(72) Inventors: Tobias Engelhardt, Stuttgart (DE); Stefan Oechslen, Stuttgart (DE); Jörg Schneider, Stuttgart (DE)

(73) Assignee: Dr. Ing. h. c. F. Porsche, Stuttgart (DE)

( * ) Notice: Subject to any disclaimer, the term of this patent is extended or adjusted under 35 U.S.C. 154(b) by 103 days.

(21) Appl. No.: 17/397,931

(22) Filed: Aug. 9, 2021

(65) Prior Publication Data
US 2022/0052583 A1    Feb. 17, 2022

(30) Foreign Application Priority Data
Aug. 14, 2020    (DE) .................. 10 2020 121 432.4

(51) Int. Cl.
*H02K 9/193* (2006.01)
*H02K 3/24* (2006.01)
*B60K 11/02* (2006.01)

(52) U.S. Cl.
CPC .............. *H02K 9/193* (2013.01); *B60K 11/02* (2013.01); *H02K 3/24* (2013.01); *H02K 2203/09* (2013.01); *H02K 2209/00* (2013.01)

(58) Field of Classification Search
None
See application file for complete search history.

(56) References Cited

U.S. PATENT DOCUMENTS

2013/0064697 A1    3/2013  Fukasaku et al.
2018/0304835 A1*  10/2018  Skalski ................. H02K 5/225

FOREIGN PATENT DOCUMENTS

| CN | 103904826 A | * | 7/2014 | ............. H02K 9/19 |
| DE | 10 2015 220 852 | | 4/2017 | |
| DE | 102015220852 A1 | * | 4/2017 | ............. H02K 11/33 |
| JP | 2017011949 A | * | 1/2017 | |
| WO | 2011/152340 | | 8/2011 | |

OTHER PUBLICATIONS

Shuji (JP 2017011949 A) English Translation (Year: 2017).*
Liu (DE 102015220852 A1) English Translation (Year: 2017).*
Lee (CN 103904826 A) English Translation (Year: 2014).*
German Search Report dated Mar. 19, 2021.

* cited by examiner

*Primary Examiner* — Tulsidas C Patel
*Assistant Examiner* — Robert E Mates
(74) *Attorney, Agent, or Firm* — Gerald E. Hespos; Michael J. Porco

(57) ABSTRACT

A drive train (100) has an electric machine (1) with a stator (2), an inverter (3) and a connection housing (4) with a coolant chamber (4.1) in which an electric conductor (5) for connecting a directly liquid-cooled stator winding (2.2) of the stator (2) to the inverter (3) is arranged. The coolant chamber (4.1) is open in a liquid-permeable manner toward a stator chamber (2.1) of the stator (2) at an opening (4.3). The electric conductor (5) is guided out of the coolant chamber (4.1) to the inverter (3) at a leadthrough (4.2), and the leadthrough (4.2) is sealed in a liquid-tight manner. A motor vehicle (200) with the drivetrain (100) also is provided.

12 Claims, 1 Drawing Sheet

DRIVE TRAIN WITH AN ELECTRIC MACHINE AND AN INVERTER, AND MOTOR VEHICLE

CROSS REFERENCE TO RELATED APPLICATION

This application claims priority under 35 USC 119 to German Patent Appl. No. 10 2020 121 432.4 filed on Aug. 14, 2020, the entire disclosure of which is incorporated herein by reference.

BACKGROUND

Field of the Invention

The invention relates to a drive train with an electric machine and an inverter, wherein the electric machine has a directly liquid-cooled stator winding. The invention also relates to a motor vehicle.

Related Art

Electric machines are typically performance limited by their maximum operating temperature, and therefore they have to be cooled during operation. Specifically in the case of high-performance electric machines, it is often provided that windings of the machine, in particular the stator winding, are acted upon directly with a coolant for cooling purposes. Direct cooling can dissipate heat significantly more efficiently than indirect cooling and ensures a permanently failure-proof operation at high powers.

Direct liquid cooling involves difficulties in the design and operation of the electric machine. More particularly, the entry of coolant into the air gap would increase frictional losses and should be avoided. A can may be used to prevent the liquid coolant flow into the air gap. A loss of liquid coolant to the outside also must be prevented, particularly at locations where electric conductors are guided through the housing of the electric machine, for example through the stator housing from the winding to an inverter.

Electric conductors typically are guided out of the stator housing at an axial end of the stator. Construction space is tight at the axial ends of the stator, particularly in the region between the winding head of the stator winding and the end of the stator housing. As a result, the electric conductor typically is guided with a geometrical offset from the winding head to the location at which the conductor leaves the stator housing. The electric conductor has to have a flexible part between winding head and housing to compensate for this geometrical offset. However, this flexible part further increases the requirement for construction space in the region of the winding head.

It is therefore an object of the invention to provide a drive train that does not have the above-described disadvantages, but rather optimizes leading of an electric conductor out of the stator housing to the inverter of the drive train without the electric conductor having to have a flexible part inside the electric machine housing.

SUMMARY

The invention relates to a drive train having an electric machine with a stator, an inverter and a connection housing with a coolant chamber in which an electric conductor for connecting a directly liquid-cooled stator winding of the stator to the inverter is arranged. The coolant chamber is open in a liquid-permeable manner toward a stator chamber of the stator at an opening. The electric conductor is guided out of the coolant chamber to the inverter at a leadthrough, and the leadthrough is sealed in a liquid-tight manner. The chamber through which coolant flows is sealed away from the stator directly at the inverter. The geometrical offset can be compensated for by the greater length of the electric conductor in the region of the coolant chamber. This large length permits a certain flexibility of the electric conductor even though the conductor typically is rather stiff. Furthermore, sealing at the inverter permits the electric conductor to be liquid-cooled directly as far as the inverter to reduce the possibility of the electric conductor overheating in this region.

The electric conductor of one embodiment comprises a busbar so that very high currents can be conducted. Busbars are conventionally rather stiff. The arrangement of the busbars permits mechanical flexibility of a magnitude sufficient to compensate for offsets due to relative movements or oscillations during operation.

The opening may be arranged on one end of the stator so that the electric conductor can be guided neatly out of the stator toward the inverter. The electric conductor can thus be guided in the axial direction out of the stator in a manner saving on construction space.

The connection housing of one embodiment has an inlet for introducing a coolant into the coolant chamber so that the coolant can flow readily through the coolant chamber. The connection housing therefore functions as a coolant supply for the stator.

The connection housing may have an outlet for conducting a coolant out of the coolant chamber so that the coolant can flow readily through the coolant chamber. Thus, the connection housing functions as a coolant discharge for the stator.

The leadthrough of some embodiments is sealed in a liquid-tight manner with a seal of the inverter. The seal may be arranged on an inverter housing of the inverter and may be placed or adhesively bonded into the inverter housing, or clamped in the inverter housing or pressed into the inverter housing. Accordingly, the connection housing can be placed onto the inverter housing in a simple and advantageous manner.

The inverter need not protrude over the stator in an axial direction parallel to a stator axis, thereby enabling a very compact constructional form. The inverter may end with the stator in the axial direction. The connection housing may be placed onto the end of the stator and onto an end of the inverter. For this purpose, it is conceivable for the end of the inverter to be arranged parallel to the end of the stator.

An outer wall of the inverter may at least partially close off the coolant chamber toward one side. It is thereby possible to save on a wall of the connection housing. Furthermore, the possibility is opened up of providing the connection housing for different geometries of inverter and stator.

A stator housing of the stator and the connection housing may not be connected integrally. Similarly, the connection housing and the inverter housing of the inverter may not be connected integrally. This permits a modular design of the drive train in a simple and advantageous manner so that individual components can be exchanged simply. Furthermore, the production of the individual components of the drive train is simplified significantly.

The invention further relates to a motor vehicle having the above-described drive train.

All of the details, features and advantages disclosed previously in conjunction with the control unit likewise relate to the drive train according to the invention and to the motor vehicle according to the invention.

Further details of the invention will become apparent from the drawings and from the following description with reference to the drawings. The drawings illustrate embodiments of the invention and do not restrict the scope of the invention.

DETAILED DESCRIPTION

Figure 1:
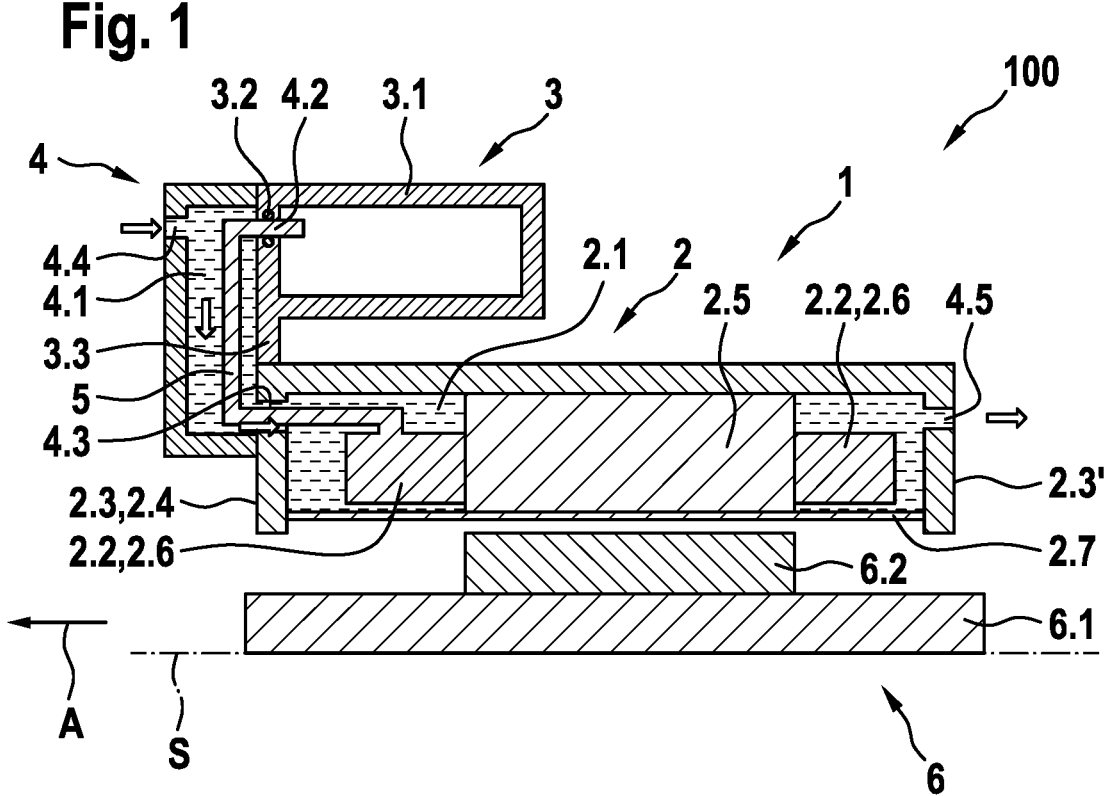
FIG. 1 schematically illustrates a drive train according to one embodiment.

FIG. 1 shows schematically a drive train 100 according to one embodiment of the invention. The drive train 100 has an electric machine 1 with a directly liquid-cooled stator winding 2.2. Electric conductors of the stator winding 2.2 are arranged to run inside a stator lamination stack 2.5 of the stator 2. The electric conductors of the stator winding 2.2 are connected in two winding heads 2.6 for the stator winding 2.2.

The stator winding 2.2 is fed by the inverter 3 with phase currents. For this purpose, the stator winding 2.2 is connected to the inverter 3 via an electric conductor 5, which is designed here as a busbar. A coolant flows through a stator chamber 2.1 of the stator 2 to cool the stator winding 2.2. Thus, the stator chamber 2.1 must be sealed in a liquid-tight manner. Accordingly, the electric machine 1 has a can 2.7 to prevent coolant from entering a region between the rotor 6 with the rotor lamination stack 6.2 and the rotor shaft 6.1. Furthermore, the location at which the electric conductor 5 is guided to the inverter 3 also has to be sealed.

For this purpose, the drive train 100 has a connection housing 4 with a continuous opening 4.3 that communicates with the inside of the stator chamber 2.1. The interior of the connection housing 4 forms a coolant chamber 4.1 through which the electric conductor 5 is guided from the opening 4.3 to a leadthrough 4.2 toward the inverter 3. The leadthrough 4.2 is sealed in a fluid-tight manner. For this purpose, the drive train 100 has a seal 3.2 that is incorporated into the inverter housing 3.1. In other words, the sealing of the stator housing 2.4 is laid from the opening 4.3 to the outlet of the electric conductor 5 toward the inverter housing 3.1. The extension of the electric conductor 5 from the winding head 2.6 to the seal 3.2 can be produced in the case of intrinsically stiff busbars as electric conductors 5 of sufficient mechanical flexibility, and therefore no flexible parts have to be incorporated into the mechanical conductor 5 in a manner taking up a large amount of construction space.

The connection housing 4 also has an inlet 4.4 for the introduction of coolant. The coolant flows through the inlet 4.4 into the coolant chamber 4.1 where it cools the electric conductor 5. From there, the coolant flows further through the opening 4.3 into the stator chamber 2.1, flushes around the winding heads 2.6 and the stator winding 2.2 and leaves the stator 2 through an outlet 4.5 on a further end 2.3' of the stator 2. The flow direction of the coolant is indicated in FIG. 1 by arrows.

A space-saving arrangement and simple installation is achieved by configuring the inverter housing 3.1 so as not to protrude over the stator housing 2.4 in an axial direction A, which is arranged parallel to the stator axis S. Furthermore, an outer wall 3.3 of the inverter 3 at least partially seals the coolant chamber 4.1 in one direction.

Figure 2:
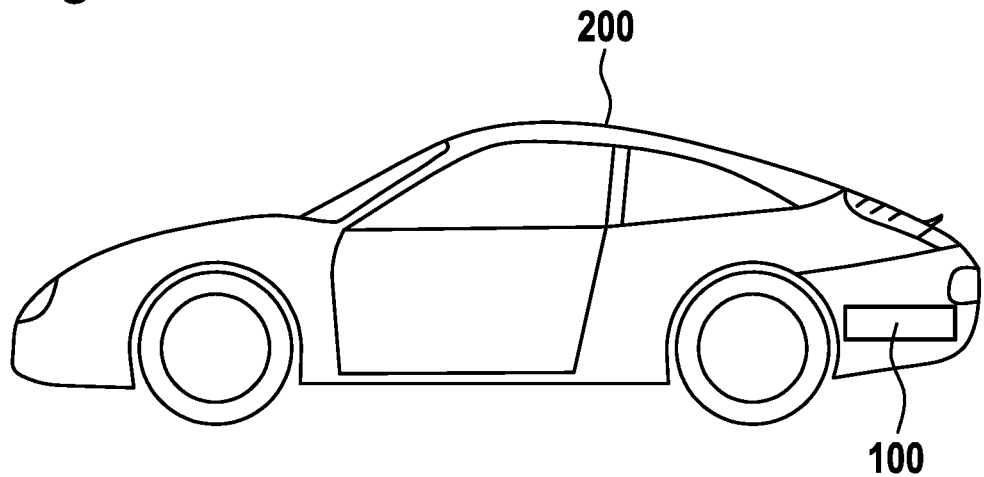
FIG. 2 schematically illustrates a motor vehicle according to one embodiment.

FIG. 2 schematically illustrates a motor vehicle 200 according to one embodiment of the invention. The motor vehicle 200 has a drive train 100 according to one embodiment of the invention.

What is claimed is:

1. A drive train comprising an electric machine with:
a stator housing having opposite first and second axial ends and a stator chamber between the first and second axial ends, a coolant outlet extending through the second axial end of the stator housing, a stator with a stator winding being in the stator chamber;
an inverter in an inverter housing radially outward from the stator housing;
a connection housing mounted to both the inverter housing and the stator housing and defining a coolant chamber with a coolant inlet spaced radially outward from the stator housing and opposed to the inverter housing, the coolant chamber further having an opening radially inward of the coolant inlet and communicating with the stator chamber at the first axial end of the stator housing;
an electric conductor connecting the stator winding of the stator to the inverter by passing from the stator chamber and into the coolant chamber via the opening in the coolant chamber, and the electric conductor continuing through the coolant chamber and guided out of the coolant chamber and into the inverter housing at a leadthrough that is sealed in a liquid-tight manner, wherein a liquid coolant flowing from the coolant inlet to the coolant outlet cools the electric conductor and the stator winding.

2. The drive train of claim 1, wherein the electric conductor comprises a busbar.

3. The drive train of claim 1, wherein the opening of the coolant chamber is arranged on one at the first axial end of the stator housing.

4. The drive train of claim 1, wherein the coolant inlet and the opening are at opposite ends of the connection housing.

5. The drive train of claim 1, wherein the leadthrough is sealed in a liquid-tight manner with a seal of the inverter housing.

6. The drive train of claim 1, wherein the inverter is arranged and configured so as not to protrude over the stator in an axial direction parallel to a stator axis.

7. The drive train of claim 6, wherein an outer wall of the inverter housing at least partially closes off the coolant chamber toward one side.

8. The drive train of claim 1, wherein an outer wall of the inverter housing at least partially closes off the coolant chamber toward one side.

9. The drive train of claim 1, wherein the stator housing and the connection housing are not connected integrally.

10. The drive train of claim 9, wherein the connection housing and the inverter housing are not connected integrally.

11. The drive train of claim 1, wherein the connection housing and the inverter housing are not connected integrally.

12. A motor vehicle having the drive train of claim 1.

* * * * *